June 4, 1935.  G. CHRISTENSON  2,003,769
PACKING FOR PISTONS
Filed May 4, 1932  2 Sheets-Sheet 1

INVENTOR.
George Christenson.
BY D. N. Halstead
ATTORNEY.

June 4, 1935.  G. CHRISTENSON  2,003,769
PACKING FOR PISTONS
Filed May 4, 1932    2 Sheets-Sheet 2
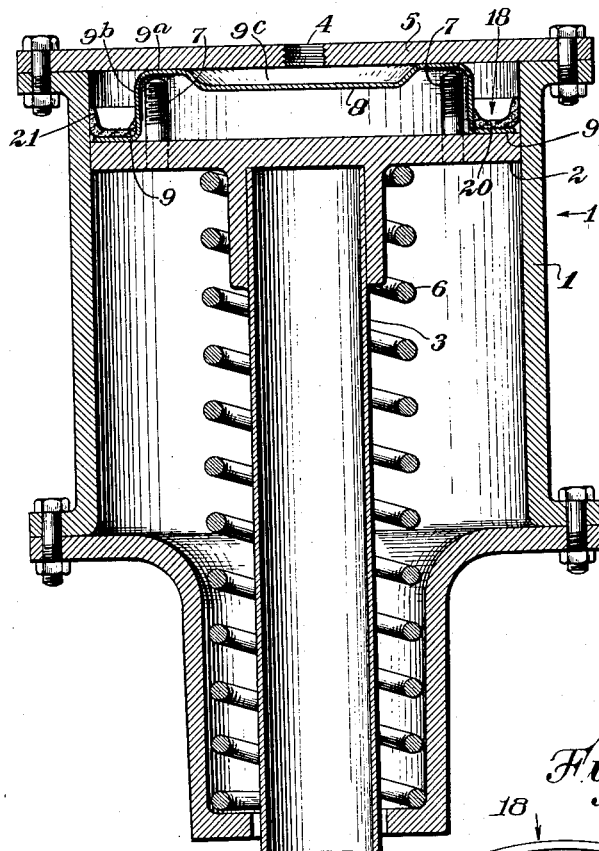
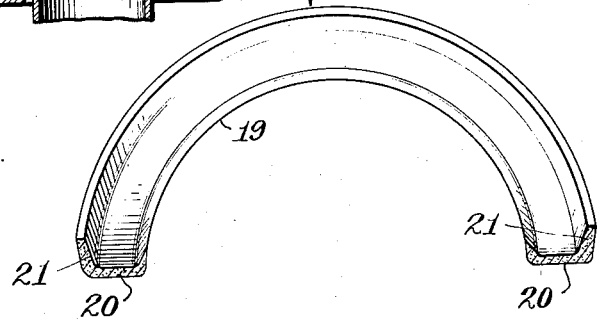
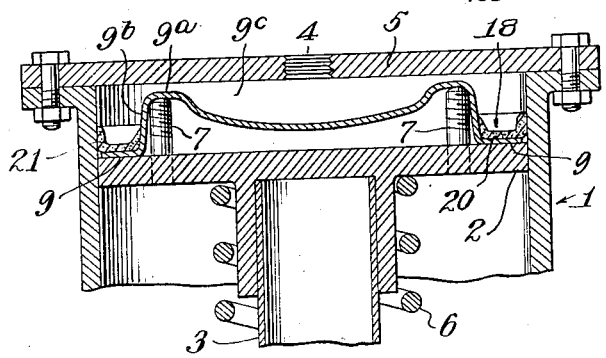
INVENTOR.
George Christenson.
BY D. N. Halstead
ATTORNEY.

Patented June 4, 1935

2,003,769

UNITED STATES PATENT OFFICE 2,003,769

PACKING FOR PISTONS

George Christenson, Plainfield, N. J., assignor to Johns-Manville Corporation, New York, N. Y., a corporation of New York Application May 4, 1932, Serial No. 609,156

6 Claims. (Cl. 60—62.6)

This invention relates to packing and particularly to a floating seal in a mechanism comprising a cylinder and a piston, as in the power cylinder of an air brake assembly. Objects of the invention are to provide a packing member that is efficient, readily replaceable, relatively inexpensive, and applicable over a widely used type of air brake piston without the removal therefrom of the stud bolts now used to hold the follower in place. Other objects and advantages will appear from the detailed description that follows.

An illustrative embodiment of the invention is described in the accompanying drawings in which Fig. 1 shows a sectional axial view through an air brake cylinder including a floating sealing member.

Fig. 3 shows a view, similar to that of Fig. 1, of a modified form of my invention.

Fig. 4 is a view, similar to Fig. 2, disclosing a modified packing element used in the floating seal or sealing member.

Fig. 5 is a longitudinal sectional view of a part of the assembly of type shown in Fig. 3, but with the flexible cup somewhat depressed at its central portion by fluid pressure, whereby the outer portion supporting the packing element is moved closer to the inside of the cylinder walls. For illustration, the flexing is somewhat exaggerated in the figure.

Figure 1:
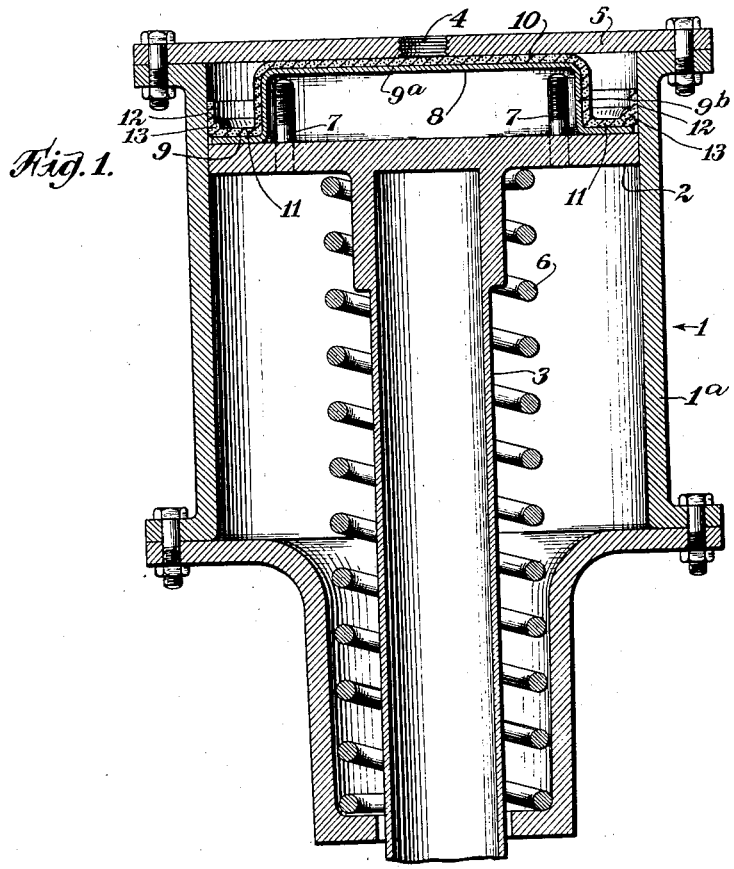

In the drawings like reference characters indicate like parts. The numeral 1 indicates the cylinder in which the brake-actuating piston 2 with its rod 3, co-acts with wall 1a to apply the brakes when air under pressure is admitted at the intake 4 or aperture in the cylinder head. 5 indicates the head of the cylinder, 6 the usual release spring adapted to return the piston 2 to its brake-release or head-end position when the air pressure is released. 7 indicates stud bolts ordinarily required for fastening packing and a follower plate, which are not shown in the figures, to the piston in a type of assembly at present much used; the removal of these stud bolts is not necessary for the installation of my floating sealing member. 8 represents a cup-shaped, shape-retaining though flexible member, preferably of metal, opening towards the piston and having a flanged portion 9 adapted to contact directly with the piston 2 and extending outwardly in a direction substantially parallel to the face of the piston and almost to the cylinder wall, a base portion 9a fitting over and clearing the studs or other members projecting from the piston, and side walls 9b. Over the bonnet 8 there is placed a composition resilient packing element 10 (Figs. 1 and 2) having a cupped portion, corresponding to the shape of the bonnet 8 and fitting snugly thereover, and a flange 11 supported by the flange 9 of the bonnet 8. The flange 11 terminates in a pressure-retaining upset annular lip 12 having a thick portion forming a reinforcing or bracing shoulder 13 at the junction of the flange 11 and lip 12.

The packing cup 10 is shaped to fit neatly the metal bonnet 8 and snugly engage in packing contact with the inside of the wall of the cylinder 1. In order to prevent the upstanding annular lip 12 from being crushed or broken, by being forced into contact with the cylinder head 5, the side wall 9b of the bonnet, extending from the base of the bonnet towards the piston 8 is made higher than the lip of the packing element in order to stop the upward movement of the piston 2, by the release spring 6, before the lip of the packing can be jammed between the piston and cylinder head. The side wall is also of sufficient height to adapt the wall to support the base of the bonnet in a position above the face of the piston and stud or other members projecting therefrom.

A modified form of the invention is illustrated in Figs. 3 and 4. The base of the bonnet is indented or depressed or otherwise formed into a shape adapted to maintain, at all times, a space 9c between the base of the bonnet and the aperture 4, in order to provide for the instantaneous application of pressure over a considerable area of the bonnet when compressed fluid is admitted through the aperture 4. The resilient, flexible, and somewhat yieldable packing element is modified to an annular form 18 supported on the inside lip 19 by the side wall 9b of the bonnet 8, on the flange member 20 by the flange 9 of the bonnet, and on the outer lip 21 by packing contact with the inside of the cylinder wall 1. To provide for snug fitting, one or both of the two upstanding lips of the packing element suitably project slightly outwardly, that is, form an angle greater than 90° with the flange member 20. To make the fitting of the packing element more satisfactory, the side wall 9b of the bonnet 8 may be shaped to extend slightly outwardly towards the periphery of the piston, that is, form an angle greater than 90° with the base 9a.

As illustrated in Fig. 4, the annular packing member comprises a stiff, shape-establishing web portion 20 and flanges 19 and 21 extending laterally from the two side edges of the portion 20 and constituting upstanding flexible lips. As used, one or both of these lips are adapted to be forced, by pneumatic pressure only, into packing contact with a surface or with surfaces to be packed.

The floating seal described may be substituted readily for the packing ring and follower plate now used in air-brake cylinders without the necessity of removing the follower holding studs or other members projecting from the piston.

No bolts are needed to hold my seal in place. The sealing member is floating, is not attached to the piston, and is moveable independently within the space between the piston and the cylinder head. When the piston 2 is being moved by fluid pressure away from the cylinder head, there is sufficient air pressure within the cylinder to hold the sealing member or piston-packing against the piston; when the pressure is reduced, the release spring forces the piston and the sealing member towards the cylinder head. The packing is held in place or maintained in operative position by fluid pressure, thereby eliminating the necessity of perforating the packing and the possibility of leakage of fluid through the perforations.

Figure 2:
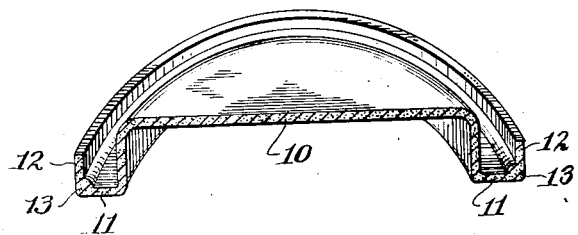
Fig. 2 shows a sectional perspective view of a resilient packing element adapted for use in the floating sealing member.

The flexible resilient packing element, such as the covering bonnet 10 of Figs. 1 and 2 or the annular member 18 of Figs. 3 and 4, may be composed of a standard packing composition.

Many variations may be made from the details given above without departing from the scope of the invention.

Thus, as the element 8 there may used a plain or dished disk, either of metal or some other rigid material, as, for example, hard rubber or asbestos impregnated with a phenol-aldehyde resin composition. While a disk of plain surface may be used, the cupped disk or bonnet is quite desirable, particularly one of a shape adapted to cover any members projecting from the piston, such as the stud bolts 7, and to maintain the packing element in packing contact with the cylinder wall, by means of the flange and also the side wall of the bonnet.

If desired, the bonnet may be of metal of such thinness or of such other construction as to be flexed slightly inwardly with respect to the rest of the bonnet, when subjected to pressure of fluid entering through the aperture in the head, thus tending to force the flange on the bonnet and the packing material thereon in closer contact with the cylinder wall. The assembly with the member 8 flexed downwardly by fluid pressure is illustrated in Fig. 5.

Although illustrated by its application to an air brake power cylinder the invention may be applied generally to mechanism comprising a piston and a cylinder with a wall and head, and suitably, also with an aperture in the head adapted to admit compressed air or other fluid under pressure, as in an air compressor, a pump in a hydraulic accumulator assembly, or other apparatus in which the mechanism operates on a liquid or gas under pressure.

The fact that the packing element is adapted to be removably engaged with the supporting disk, as by simply forcing the packing element into position over the side walls of an imperforate bonnet, permits convenient replacement of the element. Thus, there are no nuts, bolts or fastening members securing the packing to its support.

What I claim is:

1. In the combination of a cylinder provided with a head, a piston movable therein, and piston-packing means, the improvement including piston-packing means comprising a cup-shaped, shape-retaining member, disposed between the piston and the head of the cylinder and provided with an outwardly extending flange, and an independent annular packing element supported by the said flange in packing contact with the wall of the cylinder.

2. In the combination of a cylinder provided with a head, a piston movable therein, and piston-packing means, the improvement including piston-packing means comprising a flexible, cup-shaped, shape-retaining member disposed between the piston and the head of the cylinder and defining a space between the central portion of the said member and the face of the piston, whereby flexure of the said member at the central portion under pressure is permitted, and a packing element supported by the said cup-shaped member in packing contact with the cylinder wall.

3. In the combination of a cylinder provided with a head, a piston movable therein, and piston-packing means, the improvement including piston-packing means comprising a cup-shaped, shape-retaining member, disposed between the piston and the head of the cylinder and provided with an outwardly extending flange, and a packing element supported by the cup-shaped member in packing contact with the wall of the cylinder.

4. A packing assembly associated with a fluid-containing device comprising, in combination, inner and outer rigid members, defining between them an annular space to be packed, and an annular packing member disposed within the annular space, the packing member comprising a web portion and flanges extending laterally from the two side edges thereof and constituting flexible lips at least one of which is forced, by fluid pressure exclusively, into packing contact with a surface of one of the said rigid members.

5. A packing assembly of the type described in the preceding claim and having the annular packing member freely movable in packing relationship with the outer of the said rigid members.

6. In the combination of a cylinder provided with a head, a piston movable therein and piston-packing means, the improvement including a shape-retaining member disposed between the face of the piston and the head of the cylinder and independently movable with respect to the said face and the said cylinder, and a packing element supported by the said shape-retaining member in packing contact with the wall of the cylinder.

GEORGE CHRISTENSON.